United States Patent [19]
Worthington

[11] 4,049,046
[45] Sept. 20, 1977

[54] SOLAR HEATING/COOLING SYSTEM
[76] Inventor: Mark N. Worthington, 10227 White Mountain Road, Sun City, Ariz. 85351
[21] Appl. No.: 658,476
[22] Filed: Feb. 17, 1976

Related U.S. Application Data

[63] Continuation-in-part of Ser. No. 519,521, Oct. 31, 1974, Pat. No. 3,957,109.

[51] Int. Cl.² .............................................. F24D 11/00
[52] U.S. Cl. ........................................ 165/18; 62/310; 126/271; 165/48; 237/1 A
[58] Field of Search ............... 237/1 A; 126/270, 271; 165/18, 48; 62/310

[56] References Cited

U.S. PATENT DOCUMENTS

| 3,523,575 | 8/1970 | Oliveri | 165/18 |
| 3,669,184 | 6/1972 | Franzreb | 165/48 |
| 3,894,528 | 7/1975 | Subblefield | 126/270 |
| 3,957,109 | 5/1976 | Worthington | 165/48 |
| 3,998,267 | 12/1976 | Faiczak | 165/48 |

Primary Examiner—Carroll B. Dority, Jr.
Assistant Examiner—Daniel J. O'Connor
Attorney, Agent, or Firm—John A. Robertson

[57] ABSTRACT

A solar heating and cooling system comprising a multi-tiered collector and heat exchanger that is mounted on a roof or installed in a vertical wall. Each tier of the exchanger includes a plurality of longitudinal channels with upper and lower manifolds communicating with all of the channels. A duct extends from each manifold into the premises being heated with one duct being connected to an air blower. The exchanger also includes an upper or outer flat metallic sheet with a perforated feed pipe extending across the upper end of this sheet and a drain pipe that communicates with the lower end of this sheet. A heat trap in the form of a transparent sheet is spaced from this sheet. A multi-decked, louvered, enclosed evaporator is mounted on the ground over a non-pressurized liquid storage tank with the upper end of the evaporator below the lower end of the exchanger. The upper end of the evaporator is connected to the drain pipe and the storage tank to the feed pipe with a pump being associated with the storage tank and the latter connection. Valves are included in the pipes which connect the evaporator and storage tank to the exchanger and control the direction and flow of liquid to and from the exchanger. A second heat exchanger is submerged in the liquid in the storage tank and is connected to any other equipment requiring liquid at a desired temperature. A float control valve is included in the storage tank to maintain a desired liquid level therein.

10 Claims, 10 Drawing Figures

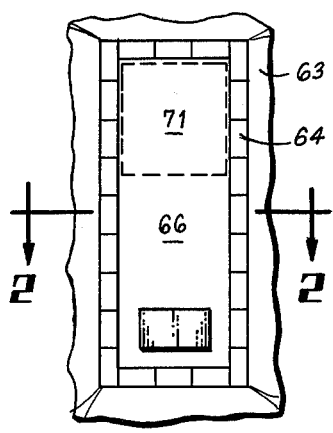
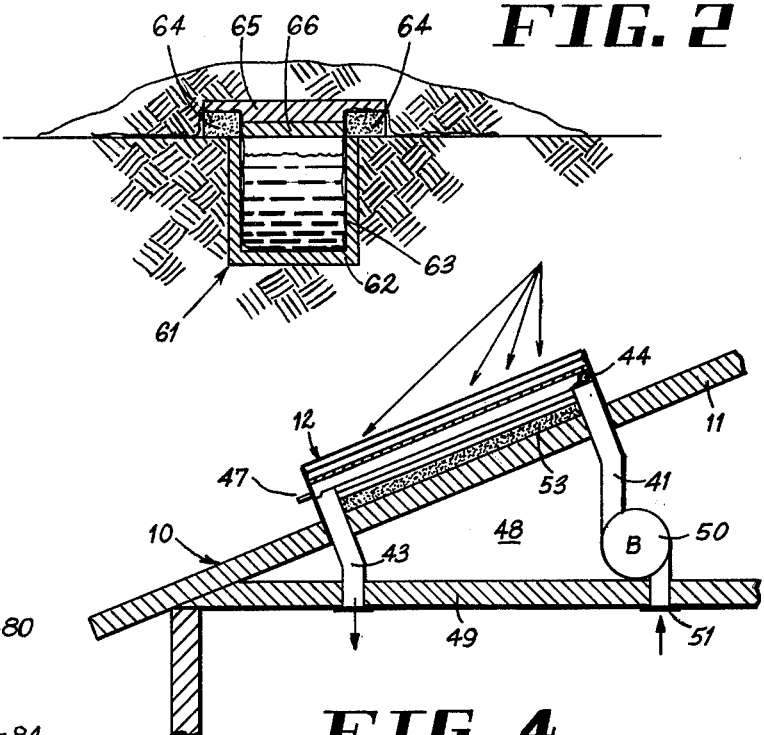
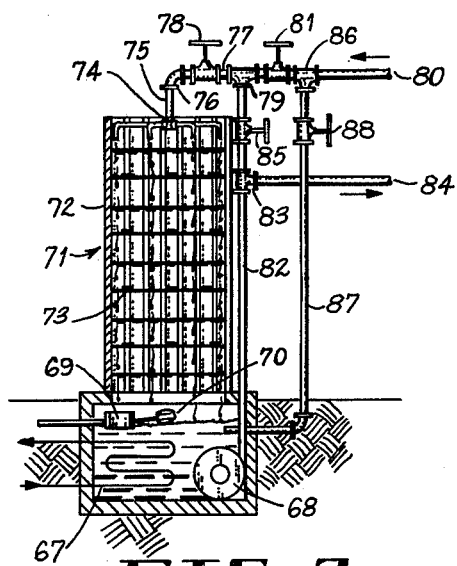
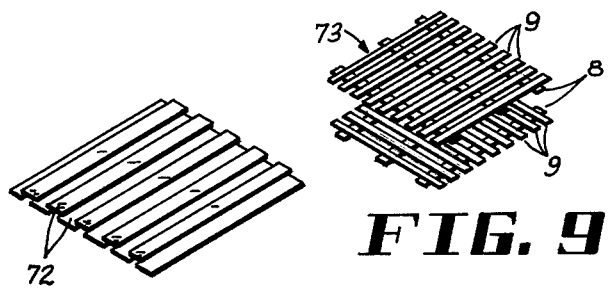
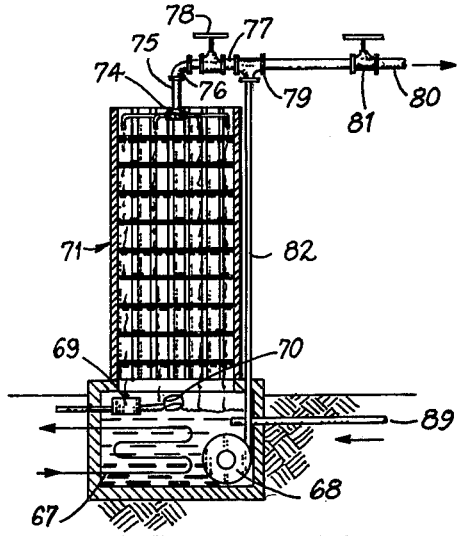
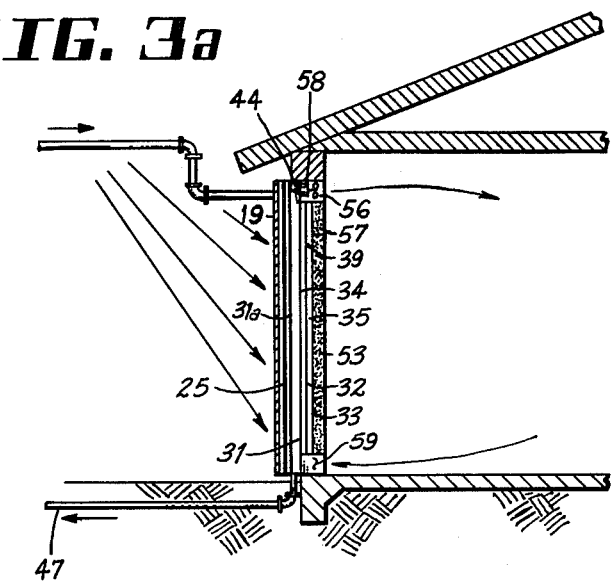

SOLAR HEATING/COOLING SYSTEM

This application is a continuation in part of the copending application of Mark N. Worthington, Ser. No. 519,521 filed Oct. 31, 1974, now U.S. Pat. No. 3,957,109, and the application of said Mark. N. Worthington Ser. No. 658,475, filed of even date herewith and entitled "Multi-Purpose Solar Collector — Heat Exchanger" is also a continuation-in-part of said application of Mark N. Worthington, Ser. No. 519,521, now U.S. Pat. No. 3,957,109.

The present invention relates to solar heating and cooling systems and is concerned primarily with such a system which includes an evaporator or cooling tower which is mounted over a storage tank.

BACKGROUND OF THE INVENTION

Due to the energy crises presently existing and the increasing price of fuel, the attention of engineers and inventors has been directed to solar heating and cooling systems. The solar collector and heat exchanger units are the very heart of any solar heating or cooling unit. If the apparatus is to be mounted on the roof of a building, and particularly on a home there are space limitations which must be accommodated. Thus, if the installation is too bulky and occupies too much space on the roof, it will not be acceptable to the public. If the units are unusually massive or heavy they are not susceptible of installation on presently existing buildings without making major structural changes to the building. The apparatus which is installed on a roof should be of compact thickness and occupy as small an area as possible to avoid an unsightly appearance.

Solar heating and cooling systems now available to the public are expensive and costly to install. The total costs attending their installation are so high as to discourage their acceptance. The present invention is founded on the belief that the system of this invention may be manufactured and installed at a price which will be acceptable to thousands of people who cannot now afford solar heating and cooling. In addition the operational cost will be a fraction of that of the conventional heating and cooling systems. One of the outstanding features of the instant system is that it may be installed in most existing houses or buildings without disrupting the present heating and/or cooling systems. It does not require that a new building or home must be constructed to accommodate it.

Know systems of this character are also notably lacking in an evaporator or cooling tower for cooling the liquid, usually water, which is used in the system and an underground storage tank over which the evaporator is mounted.

OBJECTS OF THE INVENTION

With the foregoing conditions in mind, the present invention has in view the following objectives:

1. To provide an efficient solar heating and cooling system.

2. To provide, in a solar heating and cooling system of the character aforesaid, cooling apparatus that cools air indirectly by the evaporation of water or some similar liquid.

3. To provide a solar heating and cooling system, of the kind described, which may easily be converted from cooling to heating.

4. To provide a solar heating and cooling system, of the type noted, which may be used to heat liquid that is to be stored, recycled or used for any other purpose.

5. To provide, in a solar heating and cooling system of the character aforesaid, means of cooling water or other similar liquid which is to be stored, recycled or used for any other purpose.

6. To provide a solar heating and cooling system, of the kind described, which may heat water or similar liquid during the day to be used for heating premises at night or other hours when sunshine is not available.

7. To provide, in a solar heating and cooling system of the type noted, in which the liquid may be drained back into underground storage within a short period of time such as 15 seconds to prevent freezing in cold weather.

8. To provide a solar heating and cooling system, of the character aforesaid, that may have an auxiliary closed circuit heat exchanger submerged in the storage tank for heating or cooling other liquids for other purposes.

9. To provide a solar heating and cooling system, of the kind described, which includes an underground, non-pressurized storage tank for storing hot or cold liquids to be used as required.

10. To provide a solar heating and cooling system, of the type noted, which will accomplish heating or cooling for a fraction of the energy used in the conventional heating and cooling systems.

Various other more detailed objects and advantages of the invention, such as arise in connection with carrying out the above ideas in a practical emmbodiment will in part become apparent and, in part, be hereinafter stated as the description of the invention proceeds.

SUMMARY OF THE INVENTION

The foregoing objects are achieved by providing a solar heating and cooling system which includes as a characteristic and essential element a multi-purpose solar collector-heat exchanger. This exchanger may be rectangular in shape and may be mounted on the roof of the premises to be heated or cooled at an angle ranging from 30° to 60° and for best results facing the equator. Or it may be mounted vertically in a wall of the premises to be heated or cooled. The exchanger unit comprises a plurality of longitudinal channels defined by an uppermost or outer flat metallic sheet, the outer surface of which is blackened for heat absorbing purposes, a metallic sheet having longitudinal grooves or channels which may be formed by corrugations with bends of the grooves being attached to the underside of the outer flat metallic sheet, an intermediate sheet attached to the bends or apexes remote from those secured to the uppermost sheet, a second metallic sheet having longitudinal corrugations, bends of which are attached to the intermediate sheet and a bottom or lowermost metallic sheet attached to the corrugations of the second corrugated sheet. These flat and corrugated sheets provides a multiple tier exchanger, in this instance, there being two tiers of channels. A manifold is provided at each end of the longitudinal channels. This manifold is preferably integral with the uppermost and lowermost flat sheets and includes a duct depending therefrom.

The heat exchanger unit is mounted in a frame comprising metallic side walls (having insulation on their outer surfaces) which extend above the outermost flat sheet and below the lowermost flat sheet. The frame also includes a bottom metallic wall which is mounted on a roof or wall of a building and which cooperates with the lowermost sheet of the heat exchanger unit and lower portion of the side walls to define a so called heat sink in the form of a chamber which contains heat absorbing materials. A plurality of ribs are formed integral with the lowermost sheet of the heat exchanger unit, depend therefrom, and extend into the heat absorbing materials.

A heat trap is supported above the uppermost sheet of the heat exchanger unit in spaced relation thereto. It is of transparent material with its side edges being supported by the side walls of the frame and additional intermediate supports on the uppermost sheet.

A pair of complemental covers are hingedly, retractably, or removably mounted on the upper edges of the side walls. The under surface of these covers are coated with a light-reflecting material. Apparatus is provided for moving these covers into positions in which the heat exchanger unit is always totally exposed to solar rays with one cover being in a position to reflect solar rays onto the heat exchanger unit. Such apparatus may include timing mechanism which causes the covers and reflecting portions to be in proper relation with respect to the earth's rotations. These covers may also be moved manually without the timing mechanism.

With the apparatus so far described mounted on a roof, which may have an angle of from 30° to 60° with respect to the horizontal, the duct from the upper end of the heat exchanger unit extends into a blower and thence into the premises the temperature of which is to be controlled. The duct from the other end also extends into these premises.

A perforated pipe which connects with a pump in a storage tank, extends across the upper end of the uppermost sheet of the heat exchanger unit. The liquid, hot or cold from the storage tank, is literally jetted onto this sheet at its uppermost end to form a film which flows downwardly over the sheet to a trough at its lower end. A drain pipe communicates with this trough and extends to an evaporator or (cooling tower) on the ground and to a storage tank beneath the cooling tower.

When the liquid is being cooled it flows down through the evaporator and thence to the storage tank for recycling over the heat exchanger unit. As the recycling is continued the liquid in the storage tank gradually cools down to a temperature approaching wet bulb. At this temperature it is stored until it is desired to recycle it over the heat exchanger for cooling the room air passing therein. If the liquid is being heated by the solar collector certain valves are set so that the liquid bypasses the evaporator and goes directly to the storage tank for recycling over the solar collector.

In the case of cooling, the covers on the solar collector heat exchanger are closed so as to exclude the sun's rays. In the case of heating, one of the covers is wide open and the other is positioned by hand or mechanical operation to reflect additional solar rays from its reflective surface onto the heat trap. Water or a similar liquid from the storage tank, by a pump, is introduced through the feed pipe at the upper end of the heat exchanger unit and flows down onto the blackened upper exchanger surface where it absorbs the heat imparted to this surface by the sun's rays. The heated liquid flows down and out through the drain pipe by gravity to a storage tank. From the storage tank the liquid is recycled through the feed pipe and the operation as described above is repeated.

As the recycling is continued the liquid in the storage tank gradually heats up to a temperature approaching that of the solar collector surface. This stored liquid may then be used later or at night to heat the premises by means of the heat exchanger as previously described.

An alternate method of heating the premises is hereinafter described. Air is withdrawn from the premises by the blower and forced into the upper ends of the exchanger channels by way of the manifold. As it flows downwardly through the channels, it is heated by the energy derived from the sun's rays striking the blackened upper surface of the heat exchanger. Heat is transmitted by conduction from the upper sheet to the corrugation, the intermediate sheet and the bottom sheet and hence heats the air in both the upper and lower channels.

In a modified embodiment, a blackened metallic sheet is interposed between the upper surface of the heat exchanger unit and the heat trap to inhibit condensation of vapors on the underside of the heat trap emanating from the liquid flowing down the upper surface of the heat exchanger and to prevent solar rays being reflected from this liquid.

When the apparatus is installed in the vertical wall of a building it will actually replace a portion of such a wall. In such an installation, the ducts from the manifold merely open onto the surface defining the inner side of the wall. The blower or fan is mounted in the uppermost duct.

For a full and more ciomplete understanding of the invention, reference may be had to the following description and accompanying drawings wherein:

FIG. 1 is a top plan view of the storage tank and evaporator or cooling tower that is mounted thereover.

FIG. 2 is a vertical section through the storage tank being taken on the plane of the line 2—2 of FIG. 1.

FIG. 3 is a view depicting the evaporator and storage tank in vertical section and the piping for the roof installation of the heat exchanger in elevation.

FIG. 3a is a detailed perspective of the louvers of one side of the evaporator.

FIG. 4 is a vertical section through a portion of the premises to be heated or cooled with a slanted roof having the heat exchanger mounted thereon.

FIG. 5 is a view similar to FIG. 3 illustrating the piping for a vertical wall installation.

FIG. 6 is a vertical section through a portion of a building having a vertical wall in which the heat exchanger is installed.

FIG. 9 is a detail depicting the decks of the evaporator.

DESCRIPTION OF THE PREFERRED EMBODIMENT

Figure 7:
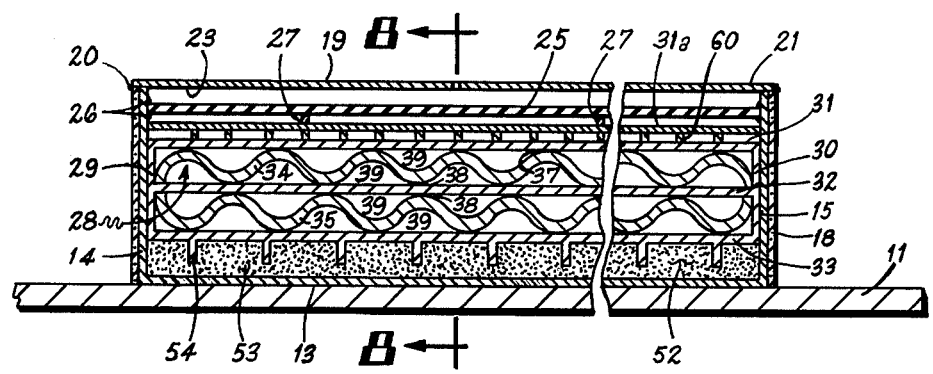
FIG. 7 is a transverse section, taken on an enlarged scale, through the heat exchanger.

In describing a preferred embodiment reference is made to certain portions of the multi-purpose solar collector - heat exchanger of the copending application above identified as being filed on even date herewith. Thus portions of the premises in which the heat exchanger is installed and the heat exchanger are illustrated in FIGS. 4, 6, 7, and 8. And, for convenience in relating the two applications, the same reference characters of the copending application are employed to describe the corresponding elements in this application.

Figure 8:
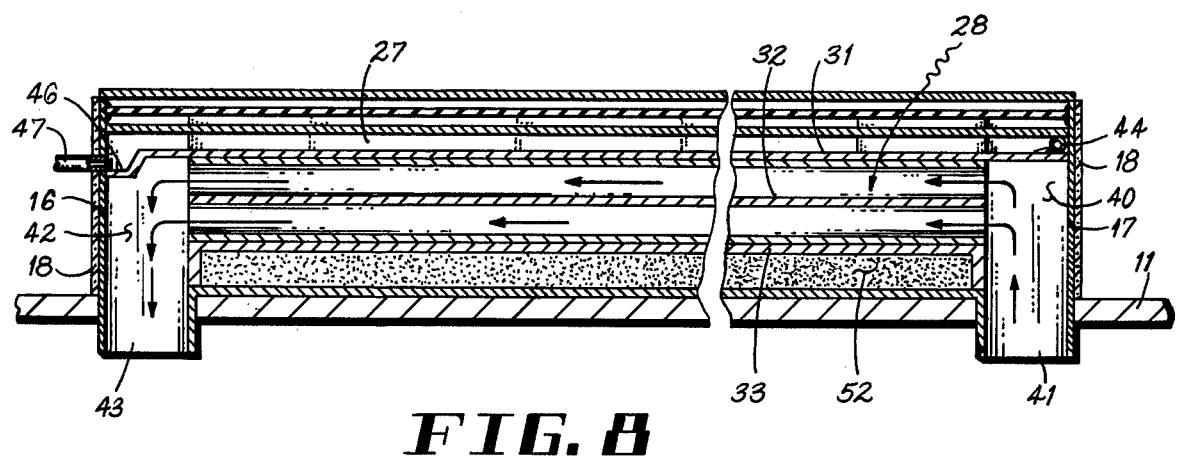
FIG. 8 is a longitudinal section through the heat exchanger of FIG. 7.

Referring now to the drawings wherein like reference characters denote corresponding elements throughout the several views, and first more particularly to FIG. 4, a building 10 includes an inclined or tilted roof section 11. For best results, this roof section 11 may be inclined at an angle ranging from 30° to 60° with respect to the horizontal. The multi-purpose solar collector-heat exchanger of this invention is shown as mounted on roof section 11 and is identified in its entirety by the reference character 12. Exchanger 12 includes a frame comprising a bottom 13, side walls 14 and 15, and end walls 16 and 17 (FIGS. 7 and 8). Walls 14, 15, 16, and 17 and covers 19 and 21 are covered on their outer exposed surface with insulation, all such insulation being designated 18.

A pair of covers 19 and 21, not illustrated in detail in the drawings of this application, are hingedly mounted on side walls 14 and 15. When these covers are in closed position they completely close the open top of the frame. The underside of each cover has a reflecting surface which may take the form of any well known reflecting material. Each of these covers may be swung into any angular position manually or by a mechanical control relative to rotation of the earth so that with one cover fully open, that is in a position totally outward of and parallel to the open top of the frame, and the other cover partially open a maximum amount of the sun's rays will be directed onto the open top of the frame. Part of these rays will be direct and the remainder reflected rays.

A heat trap 25 extends completely between side walls 14 and 15 and also completely between end walls 16 and 17. This heat trap may be made of any transparent or semi-transparent material such as glass, fiberglass, or any of the various number of plastics. It is supported in position by sealing strips 26 which may be plastic, wood, or metal. These sealing strips are applied to the side and end walls to support the heat trap 25 therefrom. Additional support may be provided by longitudinal strips 27 which depend from heat trap 25 and are supported by the heat exchanger unit now to be described.

The heat exchanger unit is referred to in its entirety by the reference character 28. It comprises a side metallic plate 29 secured to side wall 14 in any appropriate manner, another side plate 30 secured to side wall 15, a top flat sheet 31, an intermediate metallic sheet 32, a bottom flat sheet 33, an upper corrugated sheet 34 and lower corrugated sheet 35.

The upper surface of sheet 31 is blackened to impart heat absorbing properties thereto. Any conventional blacking material may be used. The upper bends of corrugated sheet 34 are secured to the lower face of sheet 31 in any desired manner that will insure a good thermal contact such as by welding or riveting. These welded bends are indicated at 37. The bends of corrugated sheet 34 remote from those at 37 are welded to intermediate sheet 32 as indicated at 38. In a similar manner, the bends of the corrugated sheet 35 are welded to the underside of intermediate sheet 32 and the upper side of lower sheet 33. Thus, the sheets 31, 32, 33, 34, and 35, define longitudinal channels 39.

It will be noted from FIG. 8 that upper sheet 31 extends the entire longitudinal length between end walls 16 and 17. Whereas sheets 32 and 33 are of a lesser longitudinal dimension. Thus, a manifold 40 is defined at the upper end of the heat exchanger unit by that portion of sheet 31 which extends beyond sheets 32 and 33, end wall 17 of the frame, bottom 13, and side walls 14 and 15 of the frame. Depending from this manifold 40 is a duct 41 which as illustrated in FIG. 8 communicates with an opening in bottom 13 substantially midway side walls 14 and 15 and passes through an opening in roof 11. Similarly a second manifold 42 is defined at the lower end of the heat exchanger unit by that portion of sheet 31 which projects beyond sheets 32 and 33, bottom 13, end wall 16, and side walls 14 and 15 of the frame.

Another duct 43 is formed integral with manifold 42 and communicates with an opening in bottom 13, midway side walls 14 and 15, and passes through an opening in roof 11.

As shown more clearly in FIGS. 4 and 8, a pipe 44 passes through side wall 15 and extends across the upper end of sheet 31. This pipe communicates with a pump at the storage tank to be later described which may contain either hot or cold liquid depending on the function to be performed by the heat exchanger. Along the entire extent of this pipe which overlies sheet 31 it is perforated along its inner side to provide for the liquid being emitted from the pipe in the form of jets. These jets from a film across the upper end of sheet 31. The film of liquid flows downwardly into a trough 46 formed in sheet 31 at the end remote from pipe 44. A drain pipe 47 takes the liquid from trough 46 and either delivers it to an evaporator when cooling or to the storage tank when heating and then it is recycled to the feed pipe 44.

The apparatus may also be used for heating it's own liquid. In this case one of the covers is wide open and the other is positioned by hand or mechanical operation to reflect additional sun rays from reflective surface onto heat trap 25. Water or a similar liquid is introduced through pipe 44 and down over the blackened, upper exchanger surface 31 where it absorbs the heat imparted to surface 31 by the sun's rays. The heated liquid flows down and out through pipe 47 to a non-pressure storage tank. From the storage tank the liquid is recycled through feed pipe 44 and the operation as described above is repeated. As the recycling is continued the liquid in the storage tank gradually heats up to a temperature approaching that of the solar collector surface 31. The stored hot liquid may then be used later or at night to heat the premises by means of the heat exchanger as previously described.

As illustrated in FIG. 4, a house 10 includes an attic 48 that is defined by a horizontal ceiling 49 of a room therebeneath. Blower 50 is supported by ceiling 49 and is connected to the lower end of duct 41. Blower 50 has an intake grill 51 which passes through an opening in ceiling 49. Duct 43 passes through another opening in ceiling 49 as illustrated in FIG. 4.

Referring now more particularly to FIG. 7, it will be noted that bottom wall 13, flat sheet 33, those portions of side walls 14 and 15 which extend below sheet 33, define a chamber 52 which constitutes a heat sink. It is given the capability of functioning as a heat sink because it is filled with a heat storage materials represented at 53. This material may be water, sand, gravel, pebbles, or any other material or combination of materials which have the capacity to have heat stored therein. As shown in FIG. 7, a plurality of ribs 54 depend from metallic sheet 33 and extend into the chamber 52 to a point spaced slightly from bottom flat wall 13. These ribs 54 may be formed integral with sheet 33 or fused thereto as by welding or soldering.

In a heat exchanger including the elements so far described it is evident that water from pipe 44 flows downwardly over the upper surface of sheet 31. It is thus heated which results in vapors emanating from the water and these vapors tend to condense on the under surface of heat trap 25. This condition impairs the transparency of heat trap 25. Moreover, some portion of the solar rays passing through heat trap 25 are reflected by the water on the sheet 31 and are therefore lost so far as heating is concerned.

To avoid these undesirable factors, a blackened sheet 31a is interposed between heat trap 25 and sheet 31. It is supported from sheet 31 by longitudinal ribs 60. Feed pipe 44 is now positioned over sheet 31 and below condensation and reflection preventing sheet 31a.

Referring now more particularly to FIGS. 1 and 2, an underground storage tank is identified in its entirety at 61. It includes side, end, and bottom walls which are lined with heat insulation 62. The corresponding surfaces of insulation 62 are in turn covered with a plastic lining 63. The exposed ground surface around the upper edges of the side and end walls are covered with bricks 64. A cover 65 for the open top of storage tank 61 has side flanges which overlie brick 64 and carry a lower layer 66 of insulation which is nested between bricks 64.

An auxiliary heat exchanger in the form of a coil 67 is submerged within the liquid, which usually is water, in the storage tank 61 and is connected, by tubing represented by the arrows, to any equipment that requires the use of heated or cooled water. A pump 68 is also illustrated as being located within tank 61 but it is to be understood that this pump might well be located outside of the tank. A valve 69 for maintaining the water in tank 61 at a desired level is under the control of a float 70.

An evaporator or cooling tower is identified in its entirety by the reference character 71 and is depicted in FIG. 1 as being mounted over storage tank 61 at one end thereof. Evaporator 71 includes four side walls, which take the form of vertical louvers 72, which are shown in detail in FIG. 3a. These louvers are of a well known louvered construction and comprise two series of spaced slats arranged in parallel planes with the slats of one series spanning the gaps between the slats of the other series. The upper and lower ends of these slats are secured to horizontal structural elements which are not illustrated in detail because such constructions are well known in the art.

A plurality of horizontal decks are represented diagrammatically in FIGS. 3 and 5, with each deck being referred to generally at 73. One of these decks is shown in detail in FIG. 9 and comprises a plurality of spaced parallel strips 9 which are secured to nailer strips 8 which extend thereacross.

In the construction of evaporator 71 as illustrated in FIG. 9, the strips 9 in one deck 73 extend in one direction and the strips in the decks thereabove and therebelow extend in a direction normal to the first mentioned deck. Thus, throughout the construction of the tower, the directions of the decks when considered in progression alternate.

A water distributor 74 is shown as being mounted at the upper end of evaporator 71 above the uppermost deck 73. Extending upwardly from distributor 74 is a vertical pipe 75 which is connected to an "L" fitting 76. Extending horizontally from fitting 76 is a horizontal pipe 77 in which a valve 78 is included. Pipe 77 is connected to a "T" fitting 79 from which extends another pipe 80 which is connected to the drain pipe 47 of the roof installation depicted in FIG. 4. A valve 81 is included in pipe 80 and also a T fitting 86.

Extending downwardly from and connected to T fitting 79 is a vertical pipe 82 which includes a T fitting 83 from which extends a pipe 84 that goes to the feed pipe 44 of FIG. 4. A valve 85 is included in pipe 82 between T fittings 79 and 83. A vertical pipe 87 extends downwardly from T fitting 86 and its lower end opens into storage tank 61. A valve 88 is included in vertical pipe 87.

The arrangement of pipes so far described is illustrated in FIG. 3 and is designed for use with the roof installation of FIG. 4. The arrangement of pipes depicted in FIG. 5 is designed for the wall installation of FIG. 6 and it will be noted includes some but not all of the elements of the piping of FIG. 3. Thus the piping of FIG. 5 includes the water distirbutor 74, vertical pipe 75, L fitting 76, horizontal pipe 77, valve 78, T fitting 79, horizontal pipe 80, and valve 81. However, in this embodiment pipe 80 is connected to feed pipe 44. Lower horizontal pipe 89 extends from drain pipe 47 to storage tank 61.

OPERATION OF THE ROOF INSTALLATION

The above described apparatus is susceptible of being operated under several conditions and to achieve various purposes. Let us first assume that the premises in house 10 beneath ceiling 49 are to be heated by solar rays. Assuming that the time of day is proper, one cover is swung into a horizontal position and the other cover assumes an erect position. The control mechanism is started in operation so that the heat trap 25 is exposed to direct rays from the sun and also the rays reflected onto the heat exchanger unit 28. These rays pass through heat trap 25 and serve to heat flat upper sheet 31 of the heat exchanger unit. This heat is transmitted through sheet 31, corrugated sheet 34, intermediate sheet 32, corrugated sheet 35, bottom sheet 33, and ribs 54 by conduction.

With blower 50 in operation, cool air from the premises below ceiling 49 will be drawn upwardly and forced through duct 41 and manifold 40. From the latter, the air is fed under pressure into the upper ends of channels 39. As the air travels downwardly through these channels it acquires heat from the surfaces which define the channels. It is then forced downwardly through manifold 42 and duct 43 into the room to be heated.

During the periods of normal operation as above described, heat is stored in the heat sink 52. Should clouds obscure the solar rays for brief intervals, heat will be released from the heat sink and heat the air which passes through the channels 39. Under some climatic conditions it may be possible to heat premises for an hour or two after sundown by heat from the heat sink.

During periods of more moderate temperatures, the premises may be heated without operating blower 50. In such cases, the flow of heated air is the reverse of that above described when blower 50 is being operated. Thus, air is drawn into the lower end of duct 43 by thermo-siphonic action and into the lower ends of channels 39. This air will be heated by solar rays and will rise upwardly in channels 39 sufficient to create a draft which will force heated from the upper ends of channels 39 downwardly through duct 41.

For heating during nighttime and long periods of cloudy skies, which block the sun, warm liquid such as water from the storage tank 61 is pumped by pump 68 through pipe 82 and pipe 84 (valve 85 is closed) and is introduced into pipe 44. It is emitted through perforations in this pipe as jets which form a film of water across the upper end of sheet 31. As this heated film of water flows down sheet 31 heat therefrom is transmitted to the heat exchanger unit 28 to heat air passing through channels 39 in exactly the same manner above described. The heated water flows by gravity from drain pipe 47 back through pipe 80, valve 88 and pipe 87 (valve 81 is closed) into the non-pressure storage tank 61. As the liquid continues to recycle over the heat exchanger it gradually heats up until it reaches a temperature approaching that of the collector surface 31. At this time the pump 68 is shut off and the hot water is stored for use at night or during periods when the sun is not shining. For heating with the hot water the circulation is the saem as when the water was being heated as described above. The valves may be operated manually or by automatic controls. When the pump 68 is stopped all water in the system immediately drains back into the underground storage tank and thereby eliminates the problems of freezing.

The premises may also be cooled by introducing a liquid such as water from the storage tank 61 which has been or is being cooled by evaporation while passing through the evaporator 71, thence to tank 61 by way of pump 68 back to the exchanger in exactly the same manner as that above described when the premises are heated. When the premises are being heated the draft of air is forced downwardly against the tendency of heated air to rise. When the premises are being cooled, the draft is increased due to the gravity effect which is created by the tendency of cold air to fall or drop. When the air is being cooled, the covers are closed to keep out the sun's rays. Also, storage sink 52 now stores cold instead of heat as previously described.

When the liquid is being cooled it flows by gravity from drain pipe 47 through pipe 80 and valves 81 and 78 (valves 85 and 88 are closed) down through distributor 74 and thence drops from deck to deck until it falls into storage tank 61. Here the liquid is picked up by pump 68 and flows through pipes 82 and 84 and thence to feed pipe 44 where it flows down over the exchanger plate 31 to complete the cycle. As the cycling continues the water or other liquid flowing down through the evaporator breaks up into many small drops as it strikes each deck. Air flowing through louvers 72 into and out of the evaporator contacts the drops of water causing a portion of the liquid to evaporate. Natural draft is usually sufficient to cause ample evaporation but forced draft by a fan may be used if desired. The evaporation of the water causes the balance of the water to lose heat until it gradually approaches wet bulb temperature which is usually from 20° to 40° below ambient temperature.

For best results the water or other liquid is cooled and stored at night and is used the next day for cooling the premises by circulating it over the exchanger 28 thus cooling the air flowing through the channels 39. All valves may be operated manually or by automatic controls.

Cooling with the wall type installation as shown in FIGS. 5 and 6 is accomplished in the same manner as described above, however, the piping and valves in this case are somewhat simplier. Another notable difference is that here the heat absorbing materials 53 of the exchanger actually store cold and through surface 57 absorb heat from the room and its contents by radiation therefrom. Thus the premises are being cooled by convection and radiation simultaneously.

Considerable cooling may be obtained at night by the phenomenon known as nocturnal radiation wherein all warm bodies radiate heat to the night sky. In this case the covers are wide open so that the entire upper surface of the exchanger is exposed to the sky. Blower 50 is turned on and the room air circulates through the exchanger causing the upper surface 31 to become as warm as the room air. This heat is then dissipated to the night sky by radiation. Cooling by night radiation may be increased if the transparent heat trap 25 is constructed so that it may be removed at night.

VERTICAL WALL INSTALLATION

The apparatus as installed in a vertical wall is illustrated in FIGS. 5 and 6. This apparatus includes most of the elements of the roof installation and such elements have been designated by corresponding reference characters. Thus the heat exchanger unit includes outer flat metallic sheet 31, intermediate sheet 32, and inner metallic sheet 33 with corrugated sheets interposed therebetween to define the longitudinal or vertical channels 39. The upper ends of these channels open onto an upper manifold 56 which is substantially the same as manifold 40 of FIG. 3 but with the notable exception that it terminates at wall surface 57 and has a fan 58 mounted therein. Lower manifold 59 communicates with the lower ends of channels 39 and it also terminates at wall surface 57. Heat sink 52 is formed between inner sheet 33 and the wall member which presents surface 57. This wall member corresponds to bottom wall 13 of the frame in FIG. 7.

The operation of the wall installation is believed to be obvious from the above description of the operation of the roof installation. It is noted that the covers are opened. Solar rays are directed onto the heat trap 25 both directly and by reflection. With fan 58 in operation cold air is drawn into manifold 59 and passes upwardly through channels 39 by which it is heated and is discharged by manifold 56 at the top. The premises may be heated by introducing hot water from the storage tank 61 into pipe 44 which presents a film of water which passes downwardly over the outerface of sheet 31. The premises may also be cooled by introducing cold water from the storage tank 61 into pipe 44. In such cases the fan 58 will overcome the tendency of cold air to move downwardly.

The wall type installation has some advantages over the roof installation. One distinct and important advantage is that the inside surface 57 becomes in effect a radiator when the unit is being used for heating. The materials in the heat sink 52 become warm and impart their heat to surface 57 which in turn radiates its heat to the room, its occupants and contents. Thus, two forms of heating are taking place simultaneously, namely, radiant heat and convected heat of the room air circulating through the exchanger. The radiant heat from surface 57, because of the heat sink 53, will continue several hours after the blower has been turned off or the sun isn't shining.

When the wall installation is being used for cooling the heat sink materials 53 store cold and then the reverse process of heating takes place, that is, the room, walls, contents, and occupants radiate their heat to the cold surface 57 where it is absorbed and dissipated through the exchanger to the cold fluid passing over surface 31.

A further advantage of the wall unit is that because of its vertical position a chimney effect in channels 39 causes the air to flow upwardly by being heated more rapidly than in the roof installation. This greater volume of air makes it possible to accomplish more heating without using the fan, and in milder weather is sufficient to heat the premises without any power at all.

Still a third advantage of the wall unit is that its location mades it conveniently accessible. Thus, the covers may be opened or closed by hand or adjusted to reflect the maximum sun rays onto the exchanger.

While preferred specific embodiments of the invention are herein disclosed it is to be clearly understood that the invention is not limited to the exact construction, mechanisms, and devices illustrated and described because various modifications of these details may be provided in putting the invention into practice.

What is claimed is:

1. In a solar heating and cooling system:
   a. a tier unit providing a plurality of longitudinal channels in parallel relation including upper and lower flat metallic sheets arranged in spaced relation with a longitudinally grooved sheet therebetween,
   b. a manifold at each end of said channels communicating with all of said channels,
   c. a duct extending from and communicating with each of said manifolds, one of said ducts constituting an air inlet and the other duct an air outlet,
   d. said tier unit being arranged in a position having a vertical component and thereby presenting upper and lower ends, a perforated feed pipe extending across the upper end of said upper flat sheet,
   e. a trough at the lower end of the said upper flat sheet with a drain pipe connected to said trough,
   f. a vertical evaporator having its upper end below the level of said trough,
   g. a pipe connecting said drain pipe to the upper end of said evaporator,
   h. a storage tank below and communicating with said evaporator,
   i. a pipe extending from said storage tank to said feed pipe; and,
   j. a pump for pumping water from said storage tank through one of said pipes to the circulated through said tier unit.

2. The solar heating and cooling system of claim 1 in which the evaporator takes the form of a vertical tower comprising vertical, louvered side walls and a plurality of horizontal decks each including a plurality of spaced strips with the strips of one deck being arranged normal to the strips of adjacent decks, and a water distributor above the uppermost deck and connected to said pipe that is connected to said drain pipe.

3. The solar heating and cooling system of claim 1 together with valves in said pipes for controling the direction and flow of liquid through said pipes.

4. The solar heating and cooling system of claim 1 in which the tier unit is mounted on a slanted roof and the pump forces water from the storage tank to the feed pipe.

5. The solar heating and cooling system of claim 1 in which the tier unit is installed in the vertical wall of a building and the pump forces water from the storage tank to the feed pipe.

6. The solar heating and cooling system of claim 1 together with an auxiliary heat exchanger submerged in the water in the storage tank and connected to equipment requiring water at a desired temperature.

7. The solar heating and cooling system of claim 1 together with a float control valve in said storage tank.

8. The solar heating and cooling system of claim 1 in which the storage tank is underground with its top being substantially at ground level and the tank having bottom, side, and end walls which are lined with heat insulating material.

9. The solar heating and cooling system of claim 1 in which a water distributor is mounted at the upper end of said evaporator, the pipe which is connected to the drain pipe is also connected to the water distributor, and includes a pair of valves together with a pair of vertical pipes each of which is connected to the pipe connected to the drain pipe and each includes a valve, one of said vertical pipes being connected to said pump at its lower end and the other vertical pipe connected to the pipe which is connected to the feed pipe.

10. The solar heating and cooling system of claim 1 in which the tier unit is installed in a vertical wall and the evaporator includes a water distributor at its upper end which is connected to the pipe which is connected to the feed pipe and includes a pair of valves, a vertical pipe extending from said pipe extending between the feed pipe and this water distributor at its upper end and its lower end to said pump and the pipe which is connected to the drain pipe opens into said storage tank.

* * * * *